US005526802A

United States Patent [19]
Riezenman

[11] Patent Number: 5,526,802
[45] Date of Patent: Jun. 18, 1996

[54] PORTABLE PLATE WARMING ENCLOSURE

[76] Inventor: Bruce Riezenman, 1887 Bennett Meadows La., Santa Rosa, Calif. 95405

[21] Appl. No.: 546,609

[22] Filed: Oct. 23, 1995

[51] Int. Cl.[6] .............................. F24C 15/18; A47G 23/04
[52] U.S. Cl. .................................... 126/246; 126/275 R
[58] Field of Search .............................. 126/246, 261, 126/273 R, 275 R, 211, 220, 281, 33, 207; 220/6; 217/16, 48; 229/125.37, 117.23; 219/385, 386

[56] References Cited

U.S. PATENT DOCUMENTS

| 230,039 | 7/1880 | Morey | 126/246 |
|---|---|---|---|
| 963,769 | 7/1910 | Johnson et al. | 220/6 |
| 1,212,429 | 1/1917 | Weinstein | 220/6 |
| 1,624,241 | 4/1927 | Hasselblatt | 126/275 R |
| 4,246,884 | 1/1981 | Vandas | 126/246 |
| 4,498,598 | 2/1985 | Bae | 220/6 |
| 4,530,344 | 7/1985 | Iyengar et al. | 126/246 |
| 4,777,930 | 10/1988 | Hartz | 126/246 |
| 5,216,948 | 6/1993 | Sheppard et al. | 126/281 |

FOREIGN PATENT DOCUMENTS

| 211895 | 10/1940 | Switzerland | 126/246 |
|---|---|---|---|
| 12041 | 12/1980 | United Kingdom | 126/246 |

*Primary Examiner*—James C. Yeung

[57] ABSTRACT

A collapsible enclosure device suitable for confining stacks of dishes for warming purposes is constructed of four sidewall panels of rigid thermally insulative material having a rectangular perimeter defined by opposed side edges, and top and bottom edges. The sidewall panels are hingedly joined at their side edges to produce an assembly that can be deployed to an open box-like configuration, and folded to a flattened storage configuration. A roof panel is configured to rest in sealing engagement atop the assembly in its deployed configuration. The roof panel is releasibly attached to the assembly in a manner which permits lifting of the device by a handle centered upon the roof panel.

5 Claims, 1 Drawing Sheet

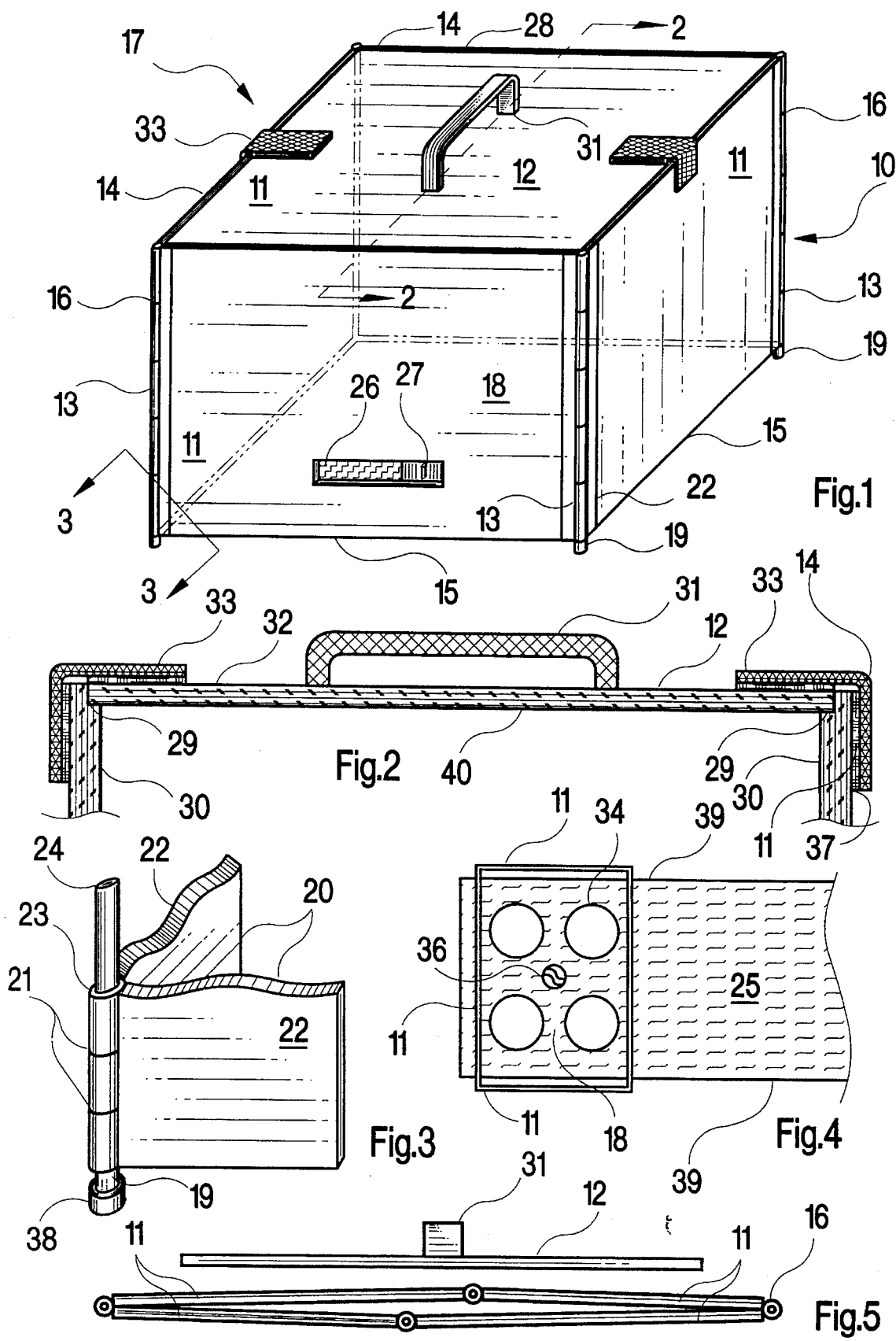

PORTABLE PLATE WARMING ENCLOSURE

BACKGROUND OF THE INVENTION

1. Field of the Invention

This invention relates to the heating of dinner plates, and more particularly concerns apparatus for heating a multitude of dinner plates in stacked array.

2. Description of the Prior Art

In situations where food is to be dispensed to a large number of people, as in buffets or seated dinners, it is often desirable to pre-warm dinner plates in preparation for the placement of food thereupon. In restaurants, permanently installed heating equipment achieves the desired pre-warming of dinner plates. If, however, a dinner is to be served as a remote catering to a large number of people in a room not equipped as a restaurant, special provisions are required to pre-warm the dinner plates.

The pre-warming of dinner plates should preferably be achievable quickly with minimal set-up time and with utilization of a safe, reliable heat source. It is also necessary that the pre-warmed plates be easily dispensed from the warming apparatus.

Devices for warming or maintaining the temperature of individual food plates are disclosed in U.S. Pat. Nos. 4,246,884 and 4,530,344. U.S. Pat. No. 4,777,930 discloses a single use, disposable heating pouch useful in warming food products within a close-fitting container. A collapsible chamber for maintaining objects at a controlled temperature is disclosed in U.S. Pat. No. 5,216,948.

The aforesaid devices however, are not directed to the specialized requirements for heating a large number of dinner plates stacked upon an ordinary table in a room not otherwise amenable to the preparation and service of food.

It is accordingly an object of the present invention to provide an enclosure device for heating stacked dinner plates.

It is another object of this invention to provide a device as in the foregoing object which is collapsible to a compact size, permitting easy transport to and from its site of deployment.

It is a further object of the present invention to provide a device of the aforesaid nature which safely and efficiently utilizes a heat source disposed within said enclosure.

It is yet another object of this invention to provide a device of the aforesaid nature of durable and simple construction amenable to low cost manufacture.

These objects and other objects and advantages of the invention will be apparent from the following description.

SUMMARY OF THE INVENTION

The above and other beneficial objects and advantages are accomplished in accordance with the present invention by a collapsible enclosure device comprising:

a) four sidewall panels fabricated of rigid thermally insulative material and having a rectangular perimeter defined by opposed side edges, and top and bottom edges, said panels being joined by hinge means at said side edges to produce an assembly which can be deployed to an open box-like configuration and folded to a flattened storage configuration b) four retaining feet downwardly directed from said assembly as extensions of said hinge means, c) an aperture of adjustable size disposed in one of said panels, d) a roof panel fabricated of rigid thermally insulative material and having a rectangular perimeter configured to rest in sealing engagement atop said assembly in its deployed configuration, e) releasible attachment means interactive between said roof panel and said sidewalls which permit the lifting of the enclosure device in its deployed configuration, and f) handle means associated with said roof panel to facilitate lifting of said device.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a perspective view of an embodiment of the enclosure device of the present invention in its deployed configuration.

FIG. 2 is an enlarged fragmentary sectional view taken in the direction of the arrows upon the line 2—2 of FIG. 1.

FIG. 3 is an enlarged perspective fragmentary view taken along the line 3—3 of FIG. 1.

FIG. 4 is a top view of the enclosure device of this invention with portions broken away and shown in association with stacked dinner plates and a heat source, and shown emplaced upon a table.

FIG. 5 is a side view of the enclosure device in its storage configuration.

The expressions "interior", "exterior", "inner", "outer", "top", and "bottom", and terms of similar import which may appear in this specification have reference to the geometrical center of the enclosure device of the present invention.

DESCRIPTION OF THE PREFERRED EMBODIMENT

Referring to FIGS. 1–5, an embodiment of the enclosure device 10 of the present invention is shown comprised of four sidewall panels 11 in an upright, deployed configuration as a box-like assembly, and roof panel 12 disposed atop said assembly.

The sidewall panels are fabricated of rigid thermally insulative, yet lightweight material. Suitable materials include polymeric foams, bonded fibrous structures, and corrugated and honeycomb composite structures. The panels may have metallized heat-reflecting surfaces or may be of other multi-layer construction, and are preferably non-flammable.

Sidewall panels 11 have a rectangular perimeter defined by opposed side edges 13, top edge 14, and bottom edge 15. Hinge means in the form of piano-type hinge 16 joins said sidewall panels at said side edges. As shown in FIG. 3, hinge 16 is comprised of two halves 20, each having a segmented channel portion 21 and wing strip 22 which is attached to the sidewall panel. The halves are mated such that the segmented channel portions enmesh to form a continuous channel 23. A hinge pin 24 insertively engages the continuous channel.

In alternative embodiments, said hinge means may be a "living hinge" representing a continuous integral extension of the panels, or may be a flexible tape. The height of the enclosure device is determined by the length of side edges 13, and the lateral expanse of the enclosure device is determined by the lengths of said top and bottom edges.

The hingedly attached sidewall panels 11 form an assembly 17 having a box-like appearance in the deployed configuration illustrated in FIG. 1, and defining an enclosed rectangular area 18. When all four sidewall panels are identical, area 18 is a square. However, when said sidewall panels exist as two pairs having the same side edge length, but different top and bottom edge lengths, the enclosed area 18 will be non-square rectangular.

Feet 19 are downwardly directed from said assembly at each corner as extensions of said hinge means. In a preferred embodiment, said retaining feet represent the hinge pin 24 which remains after the adjacent portions of wing strip 22 have been cut away. The feet 19 may be seated within friction-fitted rubber cups 38 which protect the underlying table 25 and prevent sliding movement of the enclosure device upon the table. In some embodiments, the feet extend over and abut against the edges 39 of the table to more assuredly prevent movement of the device.

An aperture 26 of adjustable size is disposed in one of said side panels. The purpose of aperture 26 is to admit controlled amounts of air to the interior region defined by said assembly. Adjustability is preferably achieved by way of sliding closure means 27 interactive with said aperture in a back-and-forth reciprocative motion. In alternative embodiments, said sliding closure means may be a rotative member.

Roof panel 12 is fabricated of rigid thermally insulative material similar to that employed in the fabrication of said side panels, and has a rectangular perimeter 28 configured to rest in sealing engagement atop said assembly in its deployed configuration. As best shown in FIG. 2, said sealing engagement may be achieved by causing the interior, lower surface 40 of roof panel 12 to seat upon recessed shoulders 29 formed in the interior surface 30 of sidewall panels 11 adjacent top edges 14. A handle 31 is centered upon the exterior, upper surface 32 of roof panel 12.

Releasible attachment means in the form of VELCRO hook and loop fastener material 33 is interactive between exterior surface 32 of said roof panel and the exterior surfaces 37 of said sidewall panels. The VELCRO serves to impart structural stability to the enclosure device and further unifies the device to permit lifting by way of handle 31. When the VELCRO material is disengaged, the various panels can be collapsed to a compact storage configuration, as shown in FIG. 5. In alternative embodiments, the releasible attachment means may comprise hook and eye combinations, magnetic material, and other securement means of equivalent function.

In use, the enclosure device is caused to embrace stacks of dinner plates 34 resting upon a table 25. A heat source 36 which may be a votive candle, sterno can, or chemical or electrical heater, is centered between the stacked plates.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A collapsible enclosure device comprising:
  a) four sidewall panels bounded by flat interior and exterior surfaces and fabricated of rigid thermally insulative material, said panels having a rectangular perimeter defined by opposed side edges, and top and bottom edges,
  b) hinge means which join said panels at said side edges to produce an assembly that can be deployed to an open box-like configuration and folded to a flattened storage configuration,
  c) four retaining feet downwardly directed from said assembly as extensions of said hinge means,
  d) an aperture of adjustable size disposed in one of said sidewall panels,
  e) a roof panel bounded by flat upper and lower surfaces, and fabricated of rigid thermally insulative material, said roof panel having a rectangular perimeter configured to rest in sealing engagement atop said assembly in its deployed configuration,
  f) releasible attachment means interactive between said roof panel and said sidewall panels which permit lifting of the enclosure device in its deployed configuration, and
  g) handle means associated with said roof panel to facilitate lifting of said device.

2. The device of claim 1 wherein the interior surfaces of said sidewall panels are provided with a recessed shoulder adjacent said top edge.

3. The device of claim 2 wherein said sealing engagement of the roof panel with said deployed assembly is achieved by way of abutment of the lower surface of said roof panel with said recessed shoulders.

4. The device of claim 1 wherein said hinge means is a piano-type hinge comprised of two halves, each having a segmented channel and wing strip, said halves being mated such that said segmented channels enmesh to form a continuous channel, and a hinge pin which insertively engages said continuous channel.

5. The device of claim 1 wherein said releasible attachment means is a VELCRO hook and loop fastener material.

\* \* \* \* \*